United States Patent [19]
Roth

[11] 3,716,833
[45] Feb. 13, 1973

[54] VEHICLE HEIGHT CLEARANCE INDICATING APPARATUS

[75] Inventor: Irving Roth, Williston Park, N.Y.
[73] Assignee: Sperry Rand Corporation
[22] Filed: Dec. 2, 1971
[21] Appl. No.: 204,074

[52] U.S. Cl. .................................. 340/61, 340/258
[51] Int. Cl. ................................................ B60q 1/00
[58] Field of Search........340/51, 52 H, 61, 104, 108, 340/258

[56] References Cited

UNITED STATES PATENTS

| | | | |
|---|---|---|---|
| 3,360,775 | 12/1967 | Schroeder | 340/258 R X |
| 2,783,450 | 2/1957 | Jackson | 340/61 |
| 3,644,917 | 2/1972 | Perlman | 340/258 R X |
| 3,152,317 | 10/1964 | Mayer | 340/104 X |

Primary Examiner—Alvin H. Waring
Attorney—Howard P. Terry

[57] ABSTRACT

Cooperating pairs of optical signal devices are employed to protect the higher parts of a motor truck from damage due to impact with a structure such as a vehicular passage way. Two directive optical radiators are employed, along with associated phase detecting sensor circuits, the radiators being modulated at the same frequency. The relative phase angles of the detected signals identify the relative height of the passage under the canopy, actuating an alarm where the canopy is too low in comparison to the highest part of the motor vehicle.

10 Claims, 4 Drawing Figures

VEHICLE HEIGHT CLEARANCE INDICATING APPARATUS

BACKGROUND OF THE INVENTION

1. Field of the Invention

The invention pertains to apparatus for detecting dangerous proximity between a fixed element and a mobile element and more particularly relates to apparatus for sensing the relative heights of a motor vehicle and of a building entry way so that the vehicle operator is presented with an indication that safe entry may be made or a warning that there will be an impact between a top part of the vehicle and the upper parts of the entry way if entry is attempted.

2. Description of the Prior Art

Safe operation of trucks and other large vehicles at loading or repair stations or the like demands careful attention to the size and height of a vehicle entry way in comparison to the size and particularly the height of the motor vehicle. The operator maneuvering a truck is at a clear disadvantage, whether moving the truck forward or backing it into an entry, in determining if the upper part of the truck or its trailer or load will safely clear the entry or canopy. Often, personnel on the ground or on the docking surface itself attempt to assist the truck operator; such persons are essentially at the same disadvantage as the truck operator, since none is able to sight along the highest part of the truck or trailer and therefore none can accurately assess the situation. Even where the clearance level is accurately posted at the entry way, good control over the docking maneuver is not strictly available, since the actual height above the pavement of the top of the truck or trailer will depend upon the weight of the load and its disposition within the vehicle, tire pressure, the wheel base of the truck or trailer relative to the inclination of the pavement, and the like.

SUMMARY OF THE INVENTION

The present invention relates to vehicle safety apparatus for enabling a vehicle operator to maneuver a vehicle such as a large truck relative to an entry of a loading or repair structure or building with minimum risk of damage to the truck or to the building entry. The invention provides optical means for sensing the relative heights of the vehicle and of the building entry or canopy so that the vehicle operator is presented within the truck cab with indications that safe movement of the truck under the canopy may or may not be made. The novel apparatus employs cooperating pairs of modulated infrared signalling devices for protecting the upper parts of the vehicle against the face or canopy of the building. Each pair of signalling devices includes a directive infrared detector and an infrared source aligned with the field of view of the associated sensor. Sensing of a dangerous overhang of the canopy or other building element is accomplished by phase sensing and indicating apparatus. The relative phase angles of the detected signals are used to sense the entry way height relative to that of the vehicle, actuating an alarm when a collision event is possible.

DESCRIPTION OF THE PREFERRED EMBODIMENTS

Figure 1:
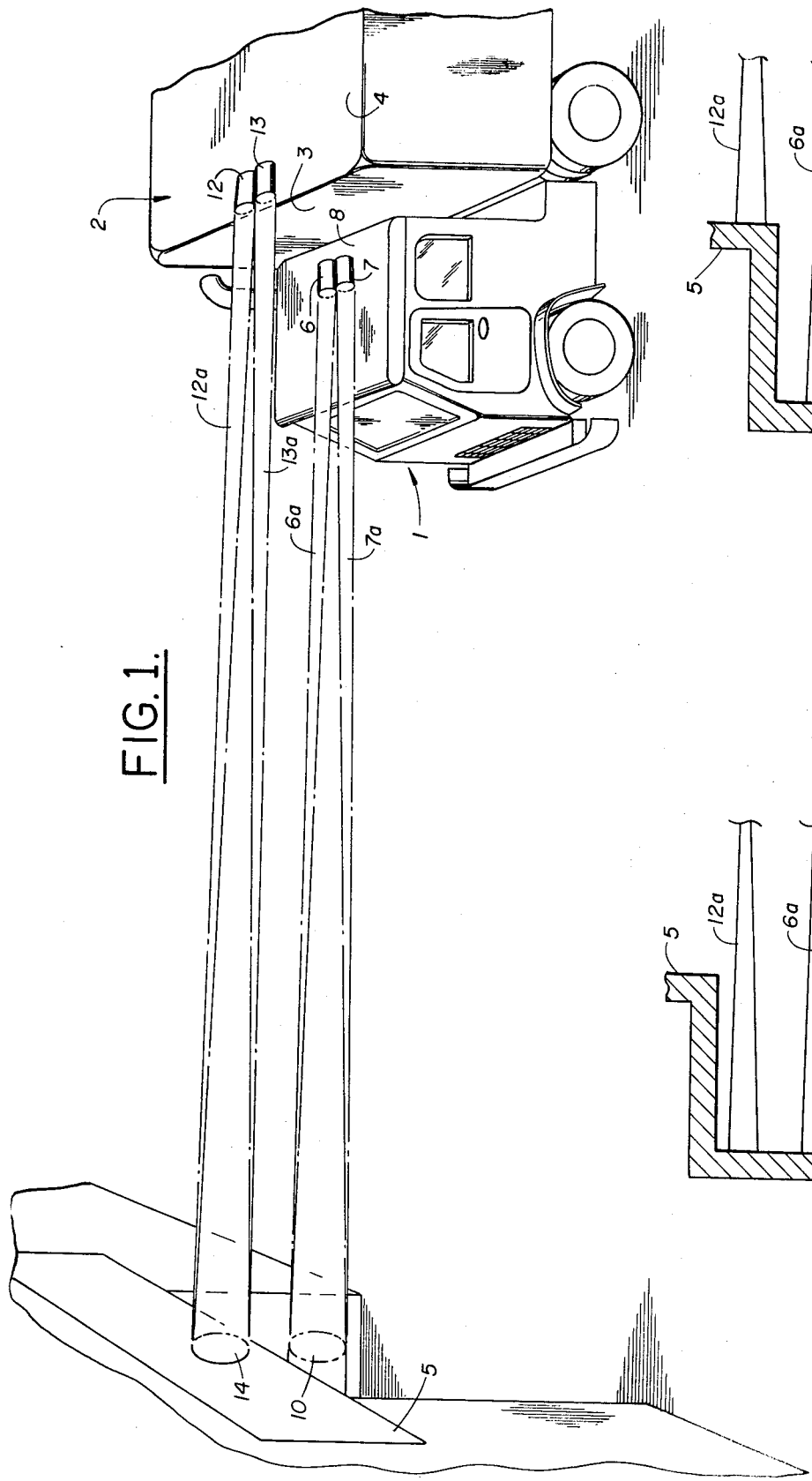
FIG. 1 is a perspective view of a truck and trailer combination on which the invention is installed, in relation to a vehicular entry way of a building.

Referring to FIG. 1, a typical installation of the safety apparatus of the present invention is designed to protect the higher parts of a motor vehicle, such as a combined tractor 1 and trailer 2, from damage due to impact with the upper part or canopy 5 of a passage way, such as a passage way leading into a freight depot or truck garage. Thus, the purpose of the invention may be, for example, to protect the frontal portion 3 of a towed trailer 2 and its roof 4 from damage by impact against the facing 5 or other parts of the entry to a covered, interior, or similar passage way. It will be understood that the protective elements of the system may also be located directly at the front of an integrated truck, or at the rear of such a vehicle as is adapted to be backed under an overhanging canopy, loading, unloading, or other purposes.

In FIG. 1, an infrared source 6 is mounted substantially centrally on the roof 8 of the truck cab and is directed forwardly at a height that is certain always to be safe; e.g., less than the lowest possible height of a normal truck entry. A companion infrared sensor or detector 7 is mounted proximate source 6 or roof 8, also directed forwardly. The radiated beam 6a from infrared source 6 is directed substantially parallel to the pavement and is aligned so as to present a cross section 10 of predetermined size at a predetermined distance in front of truck 1. The cross section 10 may have a diameter, for instance, of 14 inches at a distance of 40 feet in front of truck 1. The receptivity pattern 7a associated with infrared detector 7 similarly has substantially the same cross section 10 at the same predetermined distance in front of truck 1.

The highest surface or roof 4 of the truck or truck-trailer combination is similarly supplied at its leading edge with a substantially centrally located similar infrared source 12. Source 12 may be fixed to roof 4 or to the front 3 of the trailer near roof 4. Source 12 is directed forwardly and may be tilted up slightly at a small angle such as 1° for producing the radiation pattern 12a. A companion infrared sensor detector 13 is mounted proximate source 12 at the leading edge of roof 4, also directed forwardly. The radiated beam 12a from infrared source 12 is also directed substantially parallel to the pavement and is aligned so as to present a cross section 14 of a predetermined size (substantially of the same size as the cross section 10) at the same predetermined distance from the front of truck 1. The receptivity pattern 13a associated with infrared sensor or detector 13 similarly has substantially the same cross section 14 at the above referred to predetermined distance in front of truck 1. It is apparent that sensor or detector 13 in FIG. 1 views directly infrared energy from source 12 illuminating cross section 14 as reflected by facing 5. Similarly, it will be understood that a reflecting surface placed in the plane of cross section 10 would reflect infrared energy arising in source 6 into detector 7.

Figure 2:
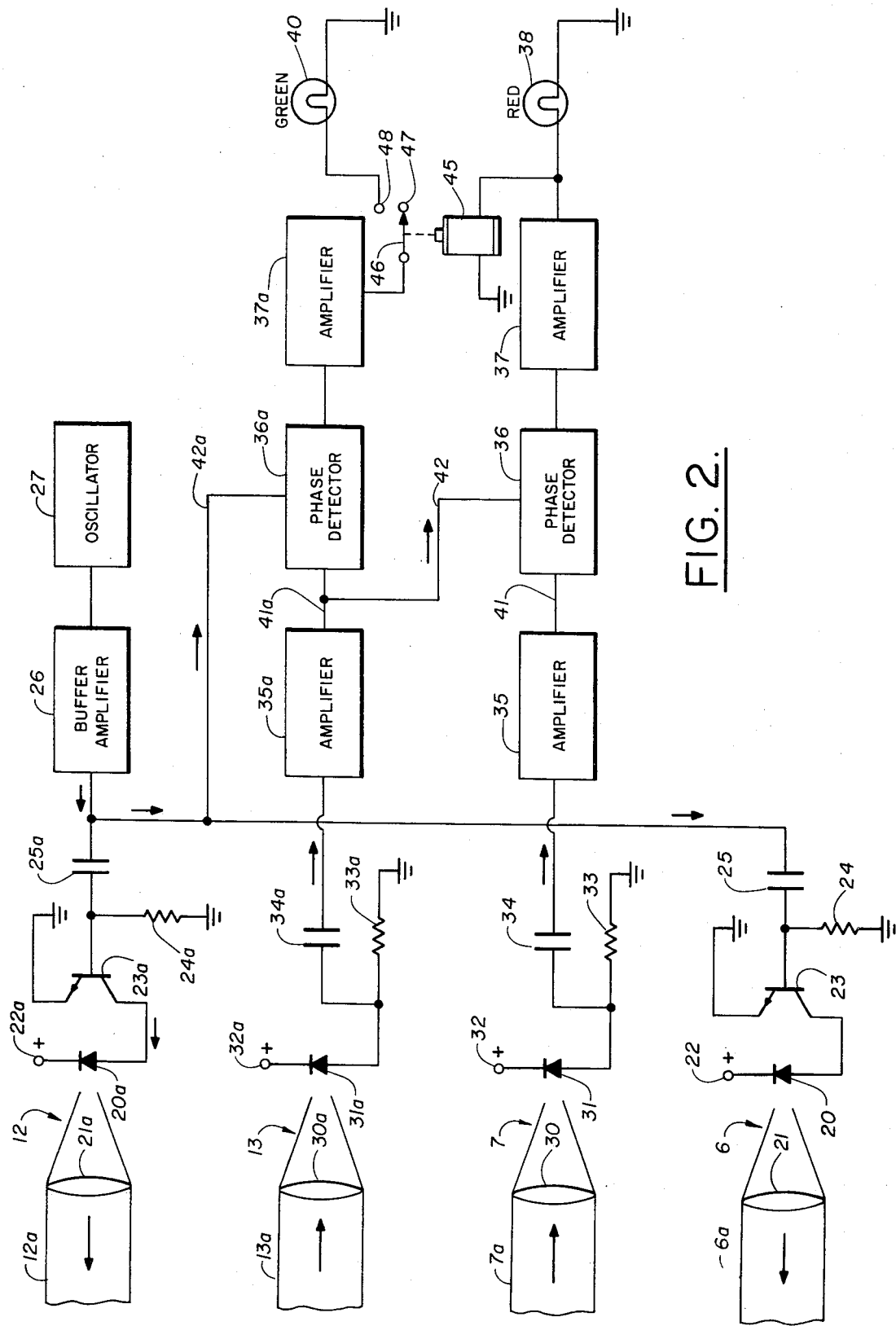
FIG. 2 is a circuit diagram of the invention showing its component parts and their interconnections.

Referring to FIG. 2, infrared source 6 and its associated elements will be discussed. The source 6 may itself utilize a conventional semiconductor electroluminescent diode 20 or other source whose optically active area is placed at the focal point of a lens 21 for generating the substantially parallel ray radiation pattern 6a. One side of infrared source or generator diode 20 is supplied with a relatively low unidirectional voltage at terminal 22 of the order, for example, of 5 volts, while the other side of diode 20 is coupled to the collector electrode of a transistor 23 whose emitter electrode is coupled to ground. The base of transistor 23 is coupled to ground through resistor 24 and also via capacitor 25 to buffer amplifier 26. Resistor 24 and capacitor 25 form an effective coupling network in the conventional manner at the frequency of operation of the conventional oscillator 27, which oscillator 27 excites the conventional buffer amplifier 26.

In a typical construction, the lens 21 may be a 7.4 centimeter diameter, 7.3 centimeter focal length device and diode 20 may be a commercially available 473A gallium arsenide electroluminescent diode, while transistor 23 is a 2N2219A transistor of the n-p-n type. Resistor 24 may be of the order of 10,000 ohms, with capacitor 25 about 1,000 picofarads. A typical operational frequency for oscillator 27 is 3 megacycles per second. The radiation emitted by gallium arsenide diode 20, while highly directive, is of the order of milliwatts, so that no hazard is presented to an eye or other tissue or object intercepting the infrared radiation pattern.

In operation, oscillator 27 supplies its preferably sinusoidal output through buffer amplifier 26 and coupling network 24, 25, to the base of the modulating transistor 23. The sinusoidal signal supplied to diode 20 by transistor 23 effectively adds and subtracts from the steady voltage applied to terminal 22 of diode 20, amplitude modulating the infrared radiation supplied by diode 20 to form the collimated radiation beam 6a.

Infrared source 12 is constructed similarly to infrared source 6, and is made up of analogous parts bearing related reference numerals. For example, the gallium arsenide diode 20a is placed at the focus of lens 21a for forming beam 12a, diode 20a being supplied with a steady voltage via terminal 22a and a modulating voltage via the collector of a transistor 23a whose emitter is coupled to ground. The base of transistor 23a is coupled via the network composed of grounded resistor 24a and capacitor 25a to the buffer amplifier 26 supplying infrared emitting diode 20. Accordingly, diode 20a forms an amplitude modulated beam 12a similar to beam 6a and modulated in phase therewith.

Infrared sensor or detector 7 utilizes a lens 30 similar to lenses 21 and 21a for focusing infrared radiation reflected from an object illuminated by source 6. Such focussed energy falls on an active area of the semiconductor infrared detector diode 31. One terminal 32 of diode 31 is coupled to a source of unidirectional voltage again, for example, of the order of five volts. The opposite terminal of detector diode 31 is coupled to ground through resistor 33 and through capacitor 34 to the conventional relatively narrow band amplifier 35. Resistor 33 and capacitor 34 form an efficient coupling network at the frequency of oscillator 27. Any modulation signal passed by amplifier 35 is supplied via lead 41 to the conventional phase detector 36, which circuit 36 is supplied also with a second signal input lead 42.

Should a unidirectional output be derived at the output of phase detector 36, it may be amplified in amplifier 37, if desired, and is then applied to the red lamp indicator or other alarm or control device 38.

In a typical construction, infrared diode 31 may be a conventional silicon detector diode. Coupling resistor 33 may be about 100,000 ohms, while capacitor 34 is about 1,000 picofarads. In operation, amplitude modulated infrared energy reflected into receptivity pattern 7a is detected by detector diode 31 and the modulation signal is supplied by the coupling network 33, 34 to amplifier 35 and thence to phase detector 36 for purposes which will be further explained.

In a similar manner, infrared sensor or detector 13 (associated with infrared source 12), utilizes a lens 30a similar to lenses 21 and 21a for focusing infrared radiation reflected from an object, such as a wall or building facing 5, illuminated by infrared source 12. Such focused energy falls on the active surface area of semiconductor infrared diode detector 31a. One terminal 32a of detector diode 31a is coupled to a unidirectional voltage source. The opposite terminal of detector diode 31a is coupled to ground through resistor 33a and is also coupled through capacitor 34a to a conventional relatively narrow band amplifier 35a. Resistor 33a and capacitor 34a form an efficient coupling network at the operating frequency of oscillator 27. The modulation signal amplified by amplifier 35a is coupled via electrical lead 41a to phase detector 36a. Circuit 36a is supplied also with a second signal input lead 42a. When a directional output is generated by phase detector 36a, it is supplied after amplification, if required, to the green lamp indicator 40. Indicator 40 may alternatively be a conventional alarm indicator device of a different type, such as an audible buzzer, or may be a control device.

A phase reference signal is coupled from oscillator 27 and buffer amplifier 26 via lead 42a to the above mentioned second input of phase detector 36a. On the other hand, a second phase reference signal for phase detector 36 is coupled via lead 42 directly from the lead 41a connecting amplifier 35a and phase detector 36a. For inhibiting indicator or control device 40 when there is an output from phase detector 36a, the output of amplifier 37 is connected to operate relay 45. Relay 45 operates switch blade 46, causing it to contact one of switch terminals 47 or 48. When amplifier 37 supplies current to illuminate red lamp 38, for instance, that same current causes relay 45 to hold switch blade 46 on the inactive terminal 47. In the absence of an output from phase detector 36, blade 46 contacts terminal 48, and the output of amplifier 37a is then conducted to green lamp 40. For this operation, the amplifier circuits 37 and 37a may be equipped with threshold or time delay circuits, as desired, to limit or otherwise modify the response of the respective indicators 38, 40 in the conventional manner. As will be appreciated by those skilled in the art, trimming phase shifters may be inserted in one or more of leads 41, 42, 41a, 42a, as may be found necessary.

Figure 3:
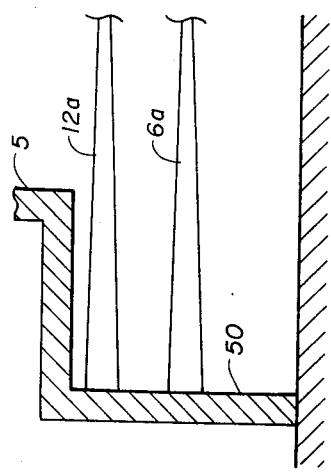

In operation, silicon detector diodes 20 and 20a receive energy only when there is an obstruction in the associated path of infrared energy from the respective infrared sources 31 and 31a. In FIG. 3, for example, where only the modulated transmitted beams 6a and 12a are seen in side view, both beams are intercepted by an interior garage wall 50 and the modulated energy is reflected to the respective diode detectors 20 and 20a. This condition is such that the lower edge of face 5 is safely higher than the top 4 of trailer 2. The round trip phase shifts of the paths of the two source-detector systems are therefore substantially equal. The phases of the modulation seen by diode detectors 31 and 31a are therefore substantially the same. Further, the phases of the inputs on leads 41, 42 connected as inputs to phase detector 36 must be substantially equal. There is no output from phase detector 36 to illuminate red lamp 38 and the switch blade 46 of relay 45 contacts terminal 48.

On the other hand, the modulation frequency and other parameters are selected so that the phase of the signal recovered by diode detector 31a in relation to the phase of the output of oscillator 27 is such that quadrature phased signals appear on phase detector leads 41a and 42a. There is therefore a finite output from phase detector 36a. Switch 46 being closed on contact 48, the green lamp 40 is illuminated.

Figure 4:
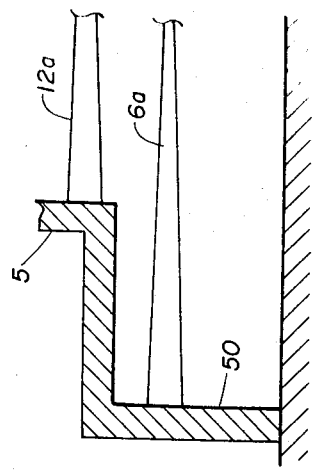
FIG. 3 and 4 are cross section views of part of a building such as that shown in FIG. 1.

If the face 5 of the passage is dangerously low in comparison to the height of trailer 2, the situation is that of FIG. 4. Only the modulated transmitted beam 6a enters the passage and strikes wall 50, while the modulated transmitted beam 12a strikes the face 5. The phases of the modulations seen by diodes 31 and 31a differ, preferably in quadrature relation. There is a finite unidirectional output from phase detector 36; red lamp 38 is therefore illuminated and relay 45 prevents green lamp 40 from being excited.

Thus, operation of green lamp 40 alone indicates that the trailer 2, or the highest point of the truck-trailer combination, may pass safely into the passage under face 5, as in FIG. 3. Operation of the red lamp 38 alone indicates that the trailer 2 is too high and will disasterously impact the face 5.

The invention as represented generally in FIG. 2 demonstrates versatility of considerable degree. In the FIG. 1 arrangement, source-detector systems 6, 7 and 12, 13 are mounted at the front of truck 1 and indicators 38 and 40 are mounted within the truck cab in the forward field of view of the operator so that they may be alerted to stop forward motion of vehicle, if required. As noted previously, the source-detector units may be similarly rearwardly mounted on rear portions of the truck; in this case, indicators 38 and 40 may be mounted in a field of view used by the operator when backing the vehicle, as in the field of view of or actually in the surface of a rear vision mirror. In the instance of a flat bed truck with a load higher than the truck cab, it is clear that source 12 and detector 13 may be affixed to the top of the load or may otherwise be mounted at an elevation as high as or slightly higher than the top of the load. It will further be noted that types of optical wave energy other than infrared waves may be employed according to the invention, and that other types of wave energy may alternatively be used. A building owner may, for example, use the invention to protect the entry of his building by mounting the infrared sources and sensors in a similarly disposed manner about the entry way for illumination of far and near portions of trucks entering the building and operation of alarms alerting a truck operator to any collision danger.

While the invention has been described in its preferred embodiments, it is to be understood that the words which have been used are words of description rather than of limitation and that changes within the purview of the appended claims may be made without departure from the true scope and spirit of the invention in its broader aspects.

I claim:
1. In a vehicle safety apparatus:
   transmitter means for illuminating with amplitude modulated optical energy first and second separated portions of an object,
   first circuit means for amplitude-modulating said transmitter means cyclically according to a reference phase,
   optical sensor means adapted for separately detecting amplitude-modulated optical energy reflected from said first and second portions,
   first circuit means responsive to said sensor means for detecting the phase between said reference phase and said amplitude-modulated optical energy reflected from said first portion,
   second circuit means responsive to said sensor means for detecting the phase between said amplitude-modulated optical energy reflected by said first and said second portions, and
   first indicator means responsive to said second circuit means activated when said first portion is closer to said vehicle than said second portion.

2. Apparatus as described in claim 1 further comprising second indicator means responsive to said first circuit means activated when said first and second portions are substantially the same distance from said vehicle.

3. Apparatus as described in claim 2 further comprising means responsive to said second circuit means for inhibiting operation of said first indicator means when said second indicator means is activated.

4. Apparatus as described in claim 1 wherein said transmitter means comprises:
   electroluminescent diode means having first and second electrodes,
   modulating transistor means having base, emitter, and collector electrodes,
   said collector electrode being coupled to said second electrode,
   said emitter electrode being coupled to ground,
   said base electrode being coupled to said first circuit means for modulating said transmitter means, and
   said first electrode being adapted to be coupled to a current source.

5. Apparatus as described in claim 1 wherein said sensor means for detecting amplitude modulated energy reflected from said first and second portion respectively comprise:
   diode optical detector means each having first and second electrodes,
   said first electrodes being adapted to be coupled to a current source, and
   said second electrodes being coupled to said respective first and second circuit means.

6. Apparatus as described in claim 1 wherein said transmitter means comprises:
   first infrared transmitter means for illuminating said first portion, and second infrared transmitter means for illuminating said second portion.

7. Apparatus as described in claim 6 wherein:
said first infrared transmitter means is affixed at a first level to said vehicle for illuminating said first portion of said object, and
said second infrared transmitter means is affixed to said vehicle at a second level lower than said first level for illuminating said second portion of said object.

8. Apparatus as described in claim 1 wherein said optical sensor means comprises:
first infrared detector means for detecting energy reflected from said first portion, and
second infrared detector means for detecting energy reflected from said second portion.

9. Apparatus as described in claim 8 wherein:
said first infrared detector means is affixed at a first level to said vehicle, and
said second infrared detector means is affixed to said vehicle at a second level lower than said first level.

10. A vehicle safety apparatus comprising:
first and second infrared transmitter means for generating respective first and second directive radiation patterns for illuminating first and second portions of an object,
first and second infrared sensor means adapted for detecting amplitude modulated energy reflected from said respective first and second portions,
first circuit means for amplitude modulating said first and second radiation patterns by a signal having a predetermined reference phase,
second circuit means for detecting the phase between said reference phase and said amplitude modulated energy when reflected from said first portion,
third circuit means for detecting the phase between said amplitude modulated energy when reflected respectively by said first and second portions, and
means for indicating the outputs of said second and third circuits.

* * * * *